Nov. 2, 1943.    R. R. WARE    2,333,400
ROLLER
Filed May 10, 1940
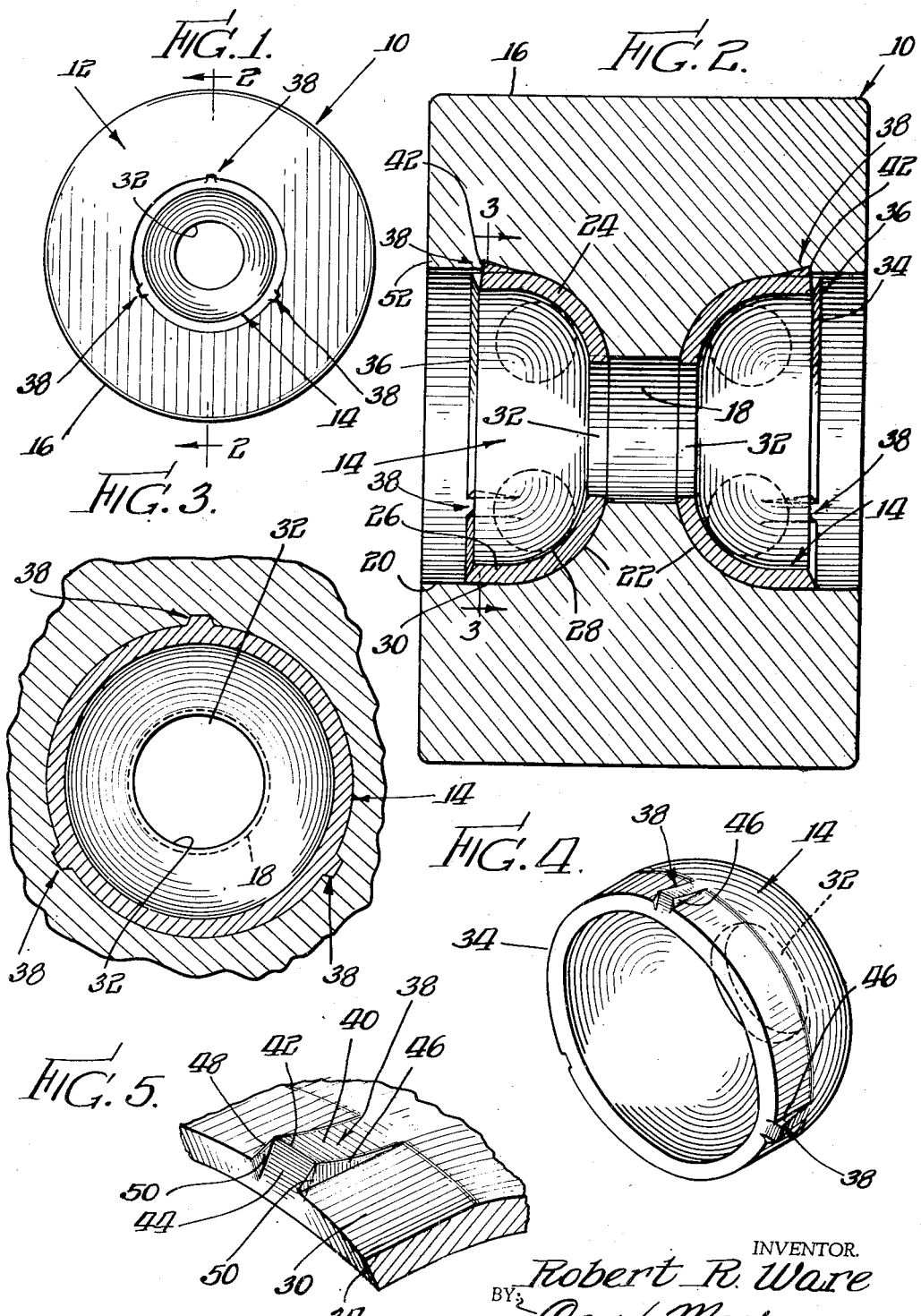
INVENTOR.
Robert R. Ware
BY Cox & Moore
ATTORNEYS.

Patented Nov. 2, 1943

2,333,400

UNITED STATES PATENT OFFICE 2,333,400

ROLLER

Robert R. Ware, Chicago, Ill., assignor to Chicago Roller Skate Company, Chicago, Ill., a corporation of Illinois Application May 10, 1940, Serial No. 334,461

10 Claims. (Cl. 301—5.7)

The present invention relates to a wheel or roller construction and more particularly to a roller of the type employed in roller skates, casters and the like.

The present invention contemplates more particularly the provision of a roller skate wheel or roller having a body, tire, or tread, of some relatively soft fibrous or plastic material as exemplified by those materials employed on so-called indoor surfaces. Yet more particularly, it will be appreciated that artificial rinks and interior floor surfaces, being subject to wear, may not be subjected to the frictional action of relatively hard rollers, wherefore it is necessary to provide tire surfaces which are relatively soft with respect to the material of the floor. The antifriction bearing surfaces necessarily forming a portion of the roller, however, desirably and necessarily comprise rigid hard materials resistant to wear.

It is an object of the present invention to provide an improved roller construction of the foregoing character, wherein the associated bearing portions of the wheel or roller interconnect therewith in an improved and simplified manner to provide a permanent assembly.

In accordance with the foregoing object, the present invention provides a roller construction which, in spite of the simplified interengagement of the parts, is capable of maintaining the assembly under conditions of severe usage prevailing in the art. It will be appreciated that roller skate wheels are not only normally subjected to intense concentrated stresses, strains and vibrations, but that in constructions employing materials of construction of widely varying properties, a tendency to loosening and separation is an important factor. The present invention, accordingly, contemplates a construction overcoming the foregoing problems by means of improved resilient and positive interlocking of the assembly in such a manner as to compensate for forces tending to loosening and separation.

A further object of the present invention is to provide in combination with a roller of the foregoing type a concave bushing forming a bearing race and resiliently engaging the relatively soft body portion while being axially positioned by means of the frictional engagement of axial locking edges.

The invention additionally contemplates a construction as above wherein extrusion of the relatively soft body material is utilized to effect an improved interlocking engagement with the locking or biting edges.

Among other objects of the present invention are to provide a roller construction as above having a bearing race bushing of relatively restricted diameter and accordingly rendering available a substantially increased thickness of body and tire material for wear and resilient engagement with the floor surfaces; to provide a construction in which locking forces are peripherally distributed to eliminate a tendency to splitting of the tire or body; to provide a construction eliminating complex assembly operations in favor of an assembly step involving the mere axial association of the parts.

Yet other and further objects of the invention will be apparent from the following description when taken in conjunction with the accompanying drawing, wherein:

Figure 1 is an elevational side view of a roller embodying the present invention;

Figure 2 is a sectional view taken centrally through the roller of Figure 1 on the plane 2—2 thereof;

Figure 3 is a detail sectional view of the central portion of the roller taken on the plane 3—3 of Figure 2;

Figure 4 is a perspective view of the bearing race or bushing shown in disassembled relationship; and Figure 5 is an enlarged detail perspective view of one of the locking abutments peripherally located upon the bushing of Figure 4.

Referring to the figures of the drawing wherein the invention is illustrated more in detail, and particularly to Figures 1 to 3, there is shown a roller skate wheel or roller indicated generally by the reference numeral 10, comprising a body, tread or tire portion 12 and a central pair of bushings 14. In the construction herein presented for illustrative purposes, the tread or body portion 12 may be formed of wood, such for example as relatively wear resistant maple, although it will be appreciated that relatively softer woods may be substituted for coaction with floor surfaces relatively more subject to wear and the present invention additionally contemplates utilization of any suitable plastic materials where desired.

The body portion 12 is in general a cylinder providing an outer annular peripheral surface 16 for contact with the floor. Coincident with the central axis is provided a bore 18 to receive the axle of the skate or caster of any suitable construction known in the art. The bore 18 is counterbored or reamed inwardly from either axial face of the roller as at 20, the counterbore terminating in a curved convex surface 22 disposed in a generally hemispherical plane and likewise annularly coincident with the axis of the central aperture 18.

It will be apparent from the foregoing that the conformation of the counterbored recesses enables them to receive the bushing race constructions 14 and shown in separate detail in Figure 4. Each of the pair of bushings 14 is preferably formed of steel or a like strong, hard, wear resistant material and comprises a sheet or plate member extruded, forged or pressed to the concavo-convex form shown in the figures and presenting an exterior convex surface complementary to the inner surface of the counterbored face 20 and 22. To this end, it will be noted that each bushing consists of a generally hemispherical wall section 24 annularly disposed about its axis, terminating outwardly in an axial annular flange portion 26. It should be further noted that this construction provides an inner, generally hemispherical ball race for the ball bearings of an antifriction bearing received as represented by the dotted line circles in Figure 2. It should be particularly noted that the outer surfaces 30 of the axially extending flange 26 are disposed in a plane parallel with the axis of the roller, thus frictionally engaging the complementary surface 22 for permanently resisting axial disassembly. An aperture 32 at the inner axial extremity of the cups 14 accommodates the central shaft aforementioned. Attention is particularly directed to the fact that the outer axial peripheral margin 34 inclines inwardly at an acute angle to the central axis, thus presenting a locking or biting edge 36 into frictional engagement with the annular surface 20. It is thought that it will be appreciated from the foregoing that when the bushing 14 is forced or driven snugly into the complementary recess provided therefor, uniform peripheral circumferential compression of the relatively soft body material is effected as the result of the introduction of the rigid supporting bushing, wherefore the body material would tend to spring inwardly about the biting edge 36.

Attention is particularly directed, however, to the fact that additional and positive axial interlocking results from the provision of a plurality of peripherally disposed locking abutments 38 adapted for driving engagement with the surrounding wall of the bore. Thus, if careful reference is had to Figures 2, 4 and 5, it will be seen that each of the projections or abutments 38 comprises an outer inclined entering surface 40 which approaches the central axis of the assembly in an inward direction and accordingly is inclined toward the convex extremity of the bushing. While the entering surface 40 may be disposed in a flat inclined plane, I prefer its arrangement in a somewhat axially arcuate plane as indicated in the figures in order to facilitate entry and subsequent permanent interengagement as will hereinafter appear more in detail. In accordance with the preferred structure, therefore, the surface 40 inclines axially inwardly in a concave plane for exerting a sharply increasing radial compression closely adjacent the outer extremity of the abutment.

It is particularly pertinent to point out that the abutment terminates outwardly in a sharp, locking or biting edge 42. It will be accordingly evident from the foregoing disclosure that the body material subjected to intense compression in the region of the abutment extremity will tend to extrude about and thus coact with the locking edge 42 in order to positively prevent axial withdrawal or loosening. In this connection, it should be further noted that the extreme outer surface 44 of the abutment 40, being disposed at an acute angle with respect to the foregoing peripheral surface 34, results in the location of the biting edge 42 axially inwardly from the marginal periphery of the bushing and thus, at a point where the body material is firmly restrained and held under compression, additionally enhances the locking action. Attention is further directed to the fact that each abutment is provided with lateral radial flanks 46 which similarly terminate in outer axial margins providing further biting or locking edges 48. It should be particularly noted that in the embodiment disclosed, the flank surfaces 46 do not terminate in the plane of the surface 44 as is contemplated in accordance with one modification of the present invention, but extend therebeyond in the form of fins or webs 50.

From the foregoing, it will be seen that the concave bushings 14 become permanently located within the roller body by being axially shifted to the position shown, and it will be appreciated that the cylindrical surfaces of the counterbore 30 are preferably so proportioned as to resiliently press upon the complementary cylindrical portion 26 of the bushing. While I do not contemplate the introduction of the bushing under excessive pressure capable of exerting disruptive forces upon the body section, nevertheless, I endeavor to promote the snug interfitting of the parts in such a manner that substantial circumferential compressive stresses are exerted to effect a material frictional inter-association of the axially extending faces. As pointed out above, moreover, the peripheral biting edge 36, as the result of the compressive engagement with the enclosing recesses, effects an important axial interengagement positively holding the bushing against removal. It will be further noted that during assembly the inclined entry surface 40 of each of the three abutments 38 compressively creates an axial groove represented in Figure 2 by the reference numeral 52 and accordingly subjecting the adjacent material to substantially increased compression, reaching a maximum just adjacent the biting edges 42 and 48. As the result of the resilience, compressive strains here concentrated, accordingly, function to extrude material about the locking edges setting up a materially increased axial interlocking continuously effective to permanently hold the parts in the position shown. It will be appreciated that only a restricted axial interengagement occurring is necessary and that Figure 2 of the drawing is accordingly more or less diagrammatical in character and it does not purport to accurately represent the degree of axial interengagement occurring. The nature of the improvement, however, will be readily understood by those skilled in the art in view of the foregoing detailed description.

It is to be particularly noted that the formation of the entry surfaces 40 is such that they gradually increase in radial elevation from their point of merger with the outer surface of the bushing and accordingly function to progressively compress the material of the roller body. Careful distinction must accordingly be made between this work compressing action and the function of mere gouging projections with which I am familiar and which tend to permanently gouge or deform the work material, wherefore extrusion of the material about the biting edge is prevented. To the end that the foregoing results may be effectively achieved the inclined entry surface is of substantial axial extent and is provided with a substantial inclination of progressively increasing elevation from the normal surface of the bushing.

It is to be noted, moreover, that the present bushing, providing as it does a combined hemispherical and cylindrical outer surface, effectively resists relative shifting within the recess. Thus, as compared with simple convex bushings which frequently tend to shift within the recesses about the approximate center of said concave surface, it will be understood that the present bushing is firmly held from such angular movement by virtue of the positive interengagement of the cylindrical surfaces which necessarily fix the bushing against angular movement transversely to the axis of the cylinder. In other words, the cylindrical portions of the bushing interlocking with the cylindrical recess permanently coaxially fix the bushing with respect to the roller at all times.

The present invention provides an improved, simplied and compact roller unit having numerous important advantages over those constructions with which I have been heretofore familiar. Among these, it will be appreciated that the roller is extremely light in weight, comprising as it does a minimum mass of relatively heavy metal and providing a substantially radially uninterrupted extent of relatively soft and/or resilient body material. Thus, in many constructions with which I am acquainted, the bushing sections comprise holding portions extending radially from the hub apertures toward the periphery of the tire and capable as the result of wear, of chipping or harmfully engaging the floor.

The assembly construction operations involved in the manufacture of the present roller are reduced to ideal simplicity. Of additional importance is the fact that the uniform circumferential disposition of the compressive stresses is such as to prevent localized strains operative to produce splitting or disruption of the body. Accordingly, therefore, the yieldable axial interengagement is such as to effect permanent rigid interassembly of the parts under the severe service normally encountered during regular use by skaters. In this connection, it is important to note that rollers constructed in accordance with the present invention are capable of withstanding the continuous vibrational and disruptive strains without loosening over especially long periods of time.

It will be understood that changes may be made in the form, construction and arrangement of the several parts without departing from the spirit or scope of the invention or sacrificing any of the intended advantages, and the right is hereby reserved to make any changes as fairly fall within the scope of the present claims.

The invention is hereby claimed as follows:

1. In a roller construction, a body portion and bushing means frictionally axially received within said body portion and comprising peripherally spaced axial locking members including an outwardly facing biting edge frictionally interengaged with an internal surface of said roller, a work compressing entry surface inclined substantially ir ardly from said biting edge and toward the axis of said roller compressively engaging the body material adjacent the biting edge and operative to cause said edge to dig into said internal surface to positively resist axial withdrawal.

2. A roller comprising a body of relatively soft material having an axial recess formed therein, a bushing of relatively hard material received within said recess and having a peripheral locking projection comprising an interlocking biting edge disposed axially inwardly of the edge of said recess, a work compressing entry surface inclined substantially inwardly from said biting edge and toward the axis of said roller compressively engaging the body material adjacent the biting edge and operative to cause the material of the body to engage said biting edge for retaining the bushing permanently in operative position.

3. A roller construction comprising a body portion of relatively soft material having an axial recess formed therein and central bearing race bushing means permanently connected therewith, said bushing means comprising an annular member complementarily received within said recess in said roller, and interlocking abutment means on the outer surface of said bushing, said abutment means comprising a peripherally disposed inclined entering surface extending axially inwardly and inclined toward the axis of the roller, said surface terminating axially outwardly in a locking edge in compressive interengagement with the inner surface of said recess and merging at its inner extremity with the said surface of the bushing.

4. A roller construction comprising a body portion of relatively soft material having an axial recess formed therein and central bearing race bushing means permanently connected therewith, said bushing means comprising an annular member having a convex wall portion and an axially disposed cylindrical wall portion complementarily received within said recess in said roller, and interlocking abutment means on the outer surface of said cylindrical portion, said abutment means comprising peripherally disposed entering surface extending axially inwardly and inclined toward the axis of the roller, said surface terminating axially outwardly in a locking edge in compressive interengagement with the inner surface of said recess.

5. A roller construction comprising a body portion of relatively soft material and a central bearing race bushing permanently associated with said body, said bushing comprising a concavo-convex wall portion, an integral flange extending axially from the outer margin of said concavo-convex wall portion and having a substantially cylindrical outer surface, said last named wall portion terminating in a marginal edge, said bushing being received in a complementary recess in said roller having inner cylindrical surface portions yieldably circumferentially engaging said first named cylindrical surface and yieldably interlocking with said edge, and locking abutment means circumferentially disposed on said cylindrical surface presenting an entry surface inclined with respect to said cylindrical outer surface and terminating at its axially oppositely disposed extremity in a work biting section, said biting section being located axially inwardly of the margin of said cylindrical surface.

6. A cup shaped bushing adapted for use as a bearing race in a roller skate construction and having a substantially axially extending exterior surface adjacent one extremity, locking projections formed on said surface and comprising a biting edge facing toward said extremity and a work compressing entry surface inclined axially from said biting edge and toward the axis of said roller for compressing work material about the biting edge when the bushing is forced into a roller body.

7. A cup shaped bushing adapted for use as a bearing race in a roller skate construction and having a substantially cylindrical outer surface and a coaxially disposed convex surface and locking abutment means disposed on said bushing and comprising an interlocking biting edge and a work compressing entry surface extending axially from said biting edge toward the convex surface, said entry surface being inclined substantially inwardly from said biting edge and toward the axis of said roller for causing material to extrude in locking relationship adjacent said biting edge when the bushing is forcefully engaged within a recess in a roller.

8. A cup shaped bushing for use as a bearing race in a roller construction and comprising a convex portion and a coaxially disposed cylindrical portion integral with the outer margins of said convex portion and annularly disposed locking abutments on said cylindrical portion presenting a work compressing entry surface inclined with respect to said cylindrical portion and terminating adjacent the free extremity of said cylindrical portion in a work biting section adapted to lockingly interengage compressed work material against axial removal when the bushing is forcefully inserted within a recess in a body portion.

9. In a roller construction for roller skates and the like, an annular body, the inner portion of which is of impressionable material, said body having oppositely disposed recesses communicating with a central aperture, a relatively hard metallic bushing member arranged within each recess, each bushing member having a substantially circular periphery and being cup-shaped, centrally apertured and snugly fitted within the walls of its recess, and a plurality of locking lugs projecting radially beyond and circumferentially spaced along the periphery of each bushing member in the vicinity of the circular outer margin thereof, said lugs being embedded in the walls of the recesses with shoulders on the recess walls overhanging the axially outwardly disposed edges of the lugs, whereby to secure the bushings and body against relative rotation and to secure the bushings against outward axial displacement with respect to the body.

10. In a roller construction for roller skates and the like, an annular body, the inner portion of which is of impressionable material, said body having oppositely disposed recesses communicating with a central aperture, a relatively hard metallic bushing member arranged within each recess, each bushing member having a substantially circular periphery and being cup-shaped, centrally apertured and snugly fitted within the walls of its recess, and a plurality of locking lugs projecting radially beyond and circumferentially spaced along the periphery of each bushing member in the vicinity of the circular outer margin thereof, said lugs being embedded in lug formed grooves in the walls of the recesses, said groove extending outwardly toward the outer edges of the recesses from the lugs and being provided with shoulders therein overhanging the axially outwardly disposed edges of the lugs, whereby to secure the bushings and body against relative rotation and to secure the bushings against outward axial displacement with respect to the body.

ROBERT R. WARE.